(12) United States Patent
Kerth et al.

(10) Patent No.: US 8,682,275 B2
(45) Date of Patent: Mar. 25, 2014

(54) APPARATUS AND METHODS FOR REDUCING INTERFERENCE IN RADIO-FREQUENCY APPARATUS

(75) Inventors: Donald A. Kerth, Austin, TX (US); G. Diwakar Vishakhadatta, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 364 days.

(21) Appl. No.: 12/828,099

(22) Filed: Jun. 30, 2010

(65) Prior Publication Data

US 2010/0267353 A1 Oct. 21, 2010

Related U.S. Application Data

(63) Continuation of application No. 10/624,456, filed on Jul. 22, 2003, now abandoned, and a continuation-in-part of application No. 09/686,072, filed on Oct. 11, 2000.

(60) Provisional application No. 60/400,255, filed on Jul. 31, 2002.

(51) Int. Cl.
*H04B 1/10* (2006.01)
*H04K 3/00* (2006.01)

(52) U.S. Cl.
USPC .......................................... 455/300; 455/295

(58) Field of Classification Search
USPC ............ 455/106, 296–301, 310–312; 330/68, 330/170; 257/659–660
See application file for complete search history.

(56) References Cited

U.S. PATENT DOCUMENTS

| 3,100,282 A | * | 8/1963 | Fletcher | 330/68 |
| 4,675,911 A | * | 6/1987 | Sokolov et al. | 455/325 |
| 5,550,544 A |  | 8/1996 | Sakiyama |  |
| 5,621,407 A |  | 4/1997 | Jeong |  |
| 5,650,659 A | * | 7/1997 | Mostafazadeh et al. | 257/660 |
| 6,198,347 B1 | * | 3/2001 | Sander et al. | 330/251 |
| 6,940,436 B2 |  | 9/2005 | Hezar |  |
| 7,143,125 B2 |  | 11/2006 | Gradishar |  |

* cited by examiner

*Primary Examiner* — Lee Nguyen
(74) *Attorney, Agent, or Firm* — Law Offices of Maximilian R. Peterson

(57) ABSTRACT

A converter in a radio-frequency (RF) apparatus includes a feedback circuitry. The feedback circuitry has a shielded input and a shielded output. The shielded input and the shielded output of the feedback circuitry tend to reduce interference in the converter.

20 Claims, 14 Drawing Sheets

APPARATUS AND METHODS FOR REDUCING INTERFERENCE IN RADIO-FREQUENCY APPARATUS

CROSS-REFERENCE TO RELATED APPLICATIONS

The present patent application is a continuation of, and incorporates by reference, U.S. patent application Ser. No. 10/624,456, filed on Jul. 22, 2003, now abandoned, titled "Apparatus and Methods for Reducing Interference in Radio-Frequency Apparatus," which claims priority to, and incorporates by reference, U.S. Provisional Patent Application Ser. No. 60/400,255, titled "Radio-Frequency Apparatus with Noise-Shaping Converter and Associated Methods," filed on Jul. 31, 2002; and which is further a continuation-in-part of, and incorporates by reference, U.S. patent application Ser. No. 09/686,072, titled "Method and Apparatus for Reducing Interference," filed on Oct. 11, 2000 now abandoned.

TECHNICAL FIELD

This patent application relates generally to radio-frequency (RF) apparatus and, more particularly, to reducing interference in RF apparatus, such as RF apparatus that includes non-linear blocks or circuitry, such as noise-shaping converters, modulators or multipliers, switched-capacitor networks or filters, and the like.

BACKGROUND

The design and architecture of RF apparatus, such as RF receivers and transceivers, has been towards increasing integration. Increasing integration tends to increase reliability, decrease footprint and cost, and provide more system-level versatility and flexibility.

The increasing integration, however, has also tended to make more challenging some aspects of RF apparatus design. For example, integrating more functionality into a single device entails coping with noise and interference problems. The noise and interference problems, if left untreated, may result in non-functioning or poorly functioning products that fail to meet their respective specifications. A need has therefore arisen for managing and mitigating noise and interference problems in integrated RF apparatus.

SUMMARY

This invention relates to reducing interference in RF apparatus and associated circuitry. One aspect of the invention concerns apparatus for reducing interference. In one embodiment, a converter in an RF apparatus includes a feedback circuit. The feedback circuit has a shielded input and a shielded output. The shielded input and the shielded output tend to reduce interference in the converter.

Another aspect of the invention relates to methods of reducing interference in RF apparatus and associated circuits. In another embodiment, a method of reducing interference in a non-linear circuit in a radio-frequency (RF) apparatus includes shielding an input of the non-linear circuit. The method also includes shielding an output of the non-linear circuit.

DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

DETAILED DESCRIPTION

Figure 1:
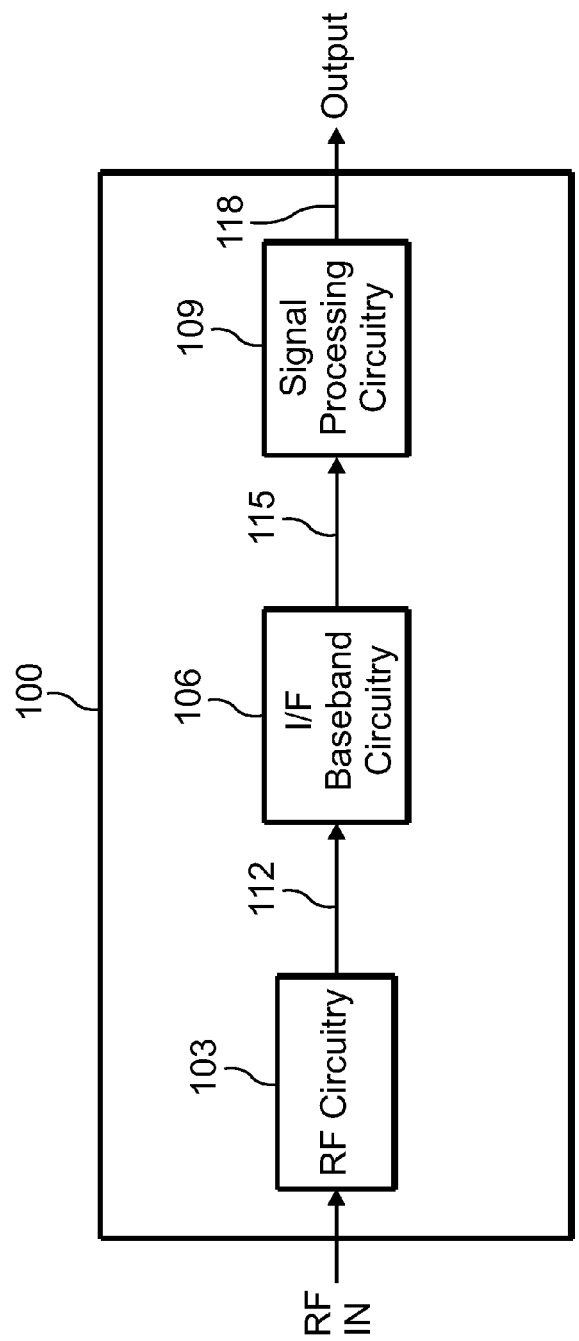
FIG. 1 shows a block diagram of a receive-path circuitry in an RF apparatus according to the invention.

This invention contemplates apparatus and methods for reducing interference in RF apparatus that include non-linear circuitry or blocks, such as switched-capacitor networks or filters, noise-shaping converters, analog-to-digital converters (ADCs), digital-to-analog converters (DACs), multipliers or modulators, and the like, as persons of ordinary skill in the art who have the benefit of the description of the invention understand.

The inventive concepts provide methods and apparatus for eliminating or reducing interference in such RF apparatus. To do so, one may shield input signal(s) (including control signal(s), reference signal(s), ground line(s), and power supply line(s)), output signal(s) (including status signal(s)), or both, of the non-linear circuit(s) or block(s). Furthermore, as an alternative to shielding (which may include using conduits), or in addition to using shields, one may filter input signal(s) (including control signal(s), reference signal(s), ground line(s), and power supply line(s)), output signal(s) (including status signal(s)), or both, of the non-linear block(s) or circuit(s).

As persons of ordinary skill in the art who have the benefit of the description of the invention understand, a shield may generally encompass a conduit. For example, one type of shield (e.g., a ground plane fabricated above or below a region, circuit, or feature of an IC) may reduce interference caused by electric fields, whereas another type of shield, a conduit, may reduce interference caused by magnetic fields. Thus, shields according to the invention include shields that primarily reduce interference because of electric fields, shields (conduits) that primarily reduce interference because of magnetic fields by reducing circuit loop areas, or both, and one may use one or both types of shields, as desired.

The RF apparatus may generally constitute RF receivers, RF transmitters, or RF transceivers, such as cellular or mobile telephones. The RF apparatus may reside in an IC, module, multi-chip module (MCM), or partition, as desired. The interfering mechanism may reside within the IC, module, partition, or MCM, or outside of it. By using the inventive concepts, one may overcome or reduce the interference that results from integrating noise-shaping converters with RF circuitry.

The inventive concepts apply effectively to cellular or mobile telephones that meet or operate according to a variety of standards, as persons skilled in the art who have the benefit of the description of the invention understand. For example, one may use the invention in RF apparatus for global system for mobile communications (GSM), general packet radio services (GPRS), enhanced GPRS (E-GPRS) or enhanced data for GSM evolution (EDGE), code division multiple access (CDMA), wideband CDMA (W-CDMA), time division multiple access (TDMA).

Furthermore, one may apply the inventive concepts to a variety of RF apparatus architectures and circuit topologies, as persons of ordinary skill in the art who have the benefit of the description of the invention appreciate. Some examples include direct-conversion RF receivers and intermediate-frequency (IF) RF receivers, including low-IF RF receivers. U.S. patent application Ser. No. 10/075,122, titled "Digital Architecture for Radio-Frequency Apparatus and Associated Methods," and incorporated by reference here, describes several examples of such receivers.

FIG. 1 shows a block diagram of a receive-path circuitry in an RF apparatus according to the invention. The receive-path circuitry resides within a circuit partition or block 100. As noted above, circuit partition 100 may constitute an integrated circuit, partition, module, or MCM, as desired.

Circuit partition 100 includes RF circuitry 103, IF/baseband circuitry 106, and signal processing circuitry 109. As noted above, generally, signal processing circuitry 109 may include a non-linear circuit or block, such as switched-capacitor networks or filters, noise-shaping converters, analog-to-digital converters (ADCs), digital-to-analog converters (DACs), multipliers or modulators, and the like, as persons of ordinary skill in the art who have the benefit of the description of the invention understand.

RF circuitry 103 receives RF signals and processes those signals, for example, by using low-noise amplifiers (LNA), and the like, as persons of ordinary skill in the art who have the benefit of the description of the invention understand. RF circuitry 103 provides processed RF signals 112 to IF/baseband circuitry 106.

IF/baseband circuitry 106 generally constitutes a signal-processing circuitry that further processes the output signals of RF circuitry 103 (i.e., processed RF signals 112) to generate output signals 115. Output signals 115 may include in-phase and quadrature signals, as desired.

The nature of the signal processing that IF/baseband circuitry 106 performs depends on the desired type and architecture of the RF apparatus within which circuit partition 100 resides. By way of illustration, desired types of RF apparatus include intermediate-frequency (IF) RF apparatus (including low-IF RF apparatus) and direct-conversion RF apparatus.

In an intermediate frequency (IF) type of RF apparatus, IF/baseband circuitry 106 provides IF signal processing, as persons of ordinary skill in the art who have the benefit of the description of the invention understand. In this type of apparatus, IF/baseband circuitry 106 constitutes an IF signal processing block or circuitry.

IF/baseband circuitry 106 may include IF down converters (and associated filters) to baseband, analog-to-digital conversion performed on the baseband signal, analog-to-digital conversion performed on the IF signal, or complex or real filtering, as desired. The operation of IF/baseband circuitry 106 in such apparatus falls within the knowledge of persons skilled in the art with the benefit of the description of the invention.

In other types of RF apparatus, for example, a direct-conversion apparatus, one may generally omit IF/baseband circuitry 106, as persons skilled in the art with the benefit of the description of the invention understand. In this type of apparatus, RF circuitry 103 may provide down conversion from RF to baseband, as desired.

Generally, IF/baseband circuitry 106 provides signals 115 (i.e., processed signals) to signal processing circuitry 109. Signal processing circuitry 109 further processes signals 115 to generate output signals 118. Note that, depending on the type and architecture of the RF apparatus, input signals 115 and output signals 118 may include in-phase and quadrature signals, as desired, and as persons of ordinary skill in the art who have the benefit of the description of the invention understand.

Figure 2:
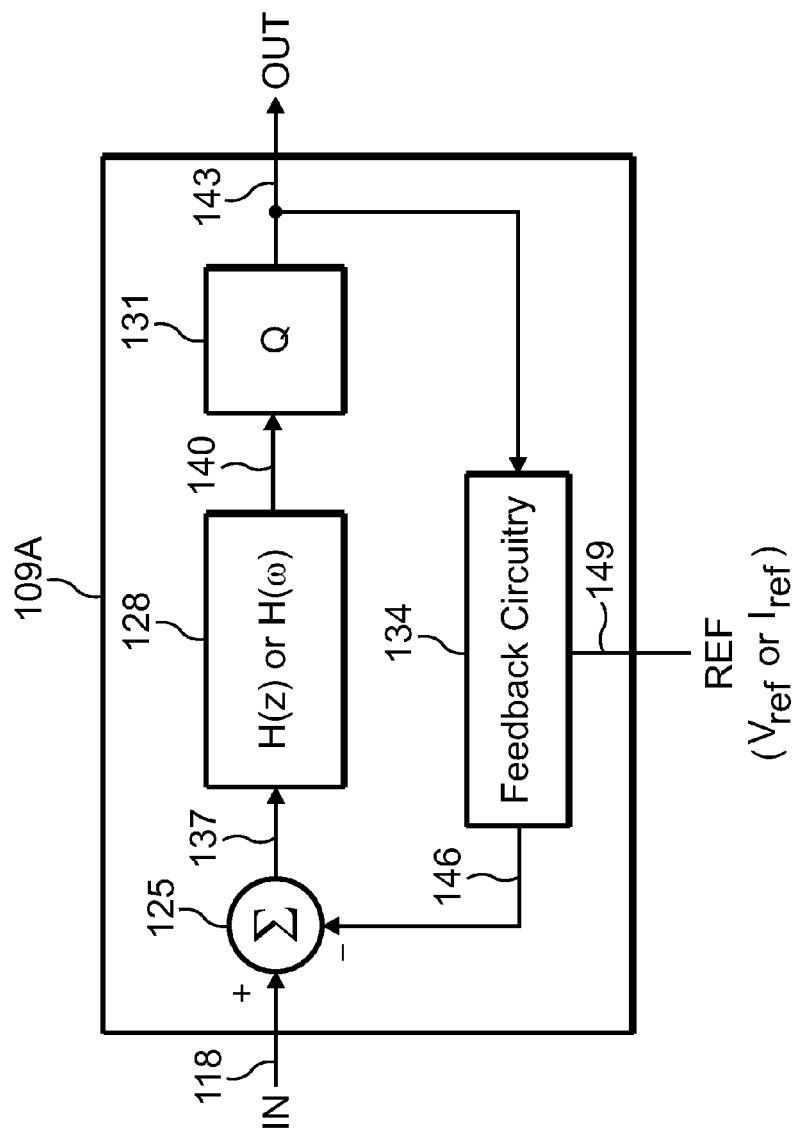
FIG. 2 illustrates a block diagram of a noise-shaping converter used in exemplary embodiments according to the invention.

FIG. 2 illustrates a block diagram of a noise-shaping converter 109A used in exemplary embodiments according to the invention. Noise-shaping converter 109A in FIG. 2 may constitute a variety of converters or circuitry, as desired. By way of illustration, it may include a delta-sigma converter, a delta modulator, a single-loop converter, a multiple-loop converter, multi-stage noise-shaping circuitry (MASH), a converter with a single-bit feedback path or circuitry, a converter with a multi-bit feedback path or circuitry, as desired, and as persons of ordinary skill in the art who have the benefit of the description of the invention understand.

Noise-shaping converter 109A includes subtracter 125, signal-processing circuitry 128, quantizer 131, and feedback circuitry 134. Feedback circuitry 134 processes output signal of noise-shaping converter 109A.

Subtracter 125 subtracts feedback signal 146 from input signal 125 to generate signal 137. Signal-processing circuitry 128 (with a transfer function denoted as $H(\omega)$ or $H(z)$) processes output signal 137 of subtracter 125, and generates output signal 140. Generally, signal-processing circuitry 128 provides a relatively high loop gain in the frequency band of interest so as to suppress quantization noise (for example, integrators or resonators), as persons skilled in the art who have the benefit of the description of the invention understand.

Quantizer 140 quantizes output signal 140 of signal-processing circuitry 128, and generates output signal 143 of noise-shaping converter 109A. Feedback circuitry 134 processes output signal 143 to generate feedback signal 146. Feedback circuitry 134 uses a reference signal 149 (for example, a current or voltage signal) to generate feedback signal 146, as persons of ordinary skill in the art who have the benefit of the description of the invention understand. Feedback circuitry 134 may include discrete-time circuitry, as desired.

Figure 3:
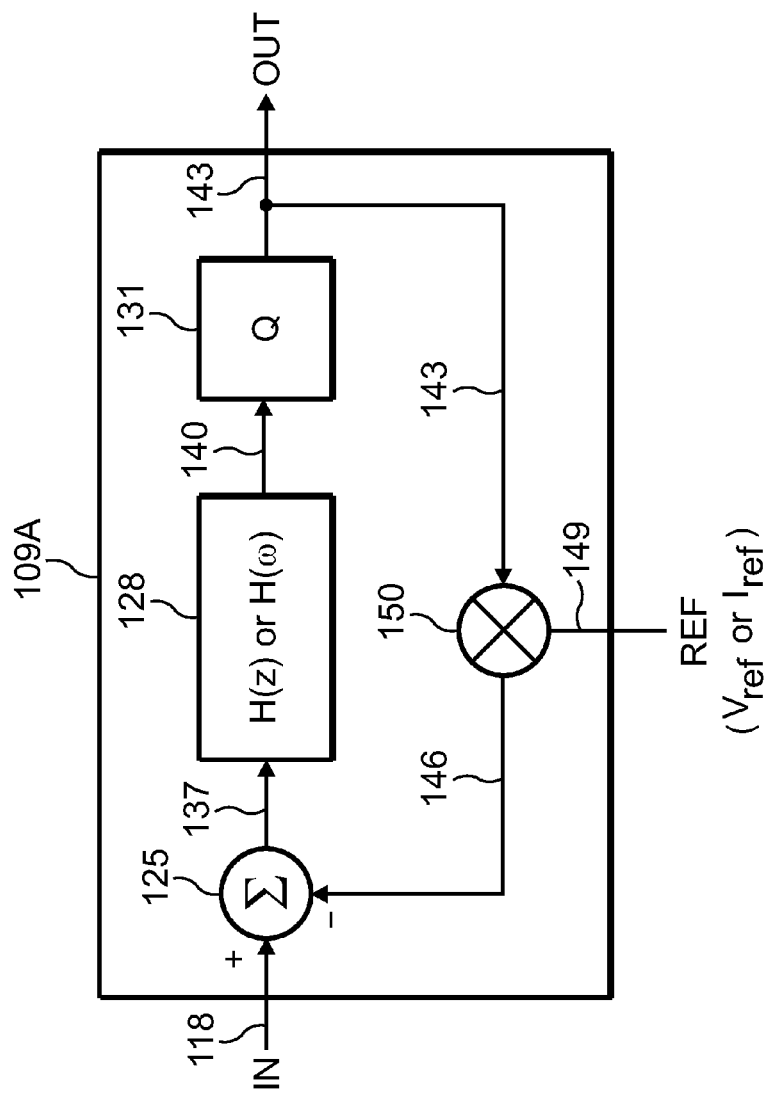
FIG. 3 depicts a block diagram of another noise-shaping converter used in exemplary embodiments according to the invention.

FIG. 3 depicts a block diagram of another noise-shaping converter 109A used in exemplary embodiments according to the invention. Noise-shaping converter 109A in FIG. 3 is similar to noise-shaping converter 109A in FIG. 2.

Referring to FIG. 3, noise-shaping converter 109A may constitute a variety of converters or circuitry, as desired, and as persons of ordinary skill in the art who have the benefit of the description of the invention understand. Generally, noise-shaping converter may include the circuitry and converters described above with respect to FIG. 2.

Noise-shaping converter 109A includes subtracter 125, signal-processing circuitry 128, quantizer 131, and modulator or multiplier 150. Rather than a generalized feedback circuitry 134 (see FIG. 2), converter 109A in FIG. 3 includes modulator 150. Modulator 150 operates on the output signal of noise-shaping converter 109A, as described below.

Similar to the embodiment in FIG. 2, subtracter 125 subtracts feedback signal 146 from input signal 125 to generate signal 137. Signal-processing circuitry 128 processes output signal 137 of subtracter 125, and generates output signal 140.

Quantizer 140 quantizes output signal 140 of signal-processing circuitry 128, and generates output signal 143 of noise-shaping converter 109A. Modulator 150 processes output signal 143 to generate feedback signal 146. More specifically, modulator 150 modulates (or mixes or multiplies) output signal 143 with a reference signal 149 (for example, a current or voltage signal) to generate feedback signal 146.

As noted above, RF apparatus that use various embodiments of the invention may operate on in-phase and quadrature inputs and/or outputs. Note that one may replicate the circuitry shown in FIGS. 2 and 3 to provide a noise-shaping converter that accepts and processes in-phase and quadrature signals to generate in-phase and quadrature output signals, as desired.

As noted above, integrating noise-shaping converters with RF circuitry (such as the receive-path circuitry of an RF receiver) may cause interference with the operation of the converters. The interference results from coupling among various blocks or circuits in an IC or partition that includes the converters and the RF circuitry. The interference can cause RF signals present within the RF circuitry to couple to the converter circuitry. The coupling of the interference may have undesired effects on the converter circuitry, for example, by corrupting (or making noisy) its reference signal, its output signal, or both.

Figure 4:
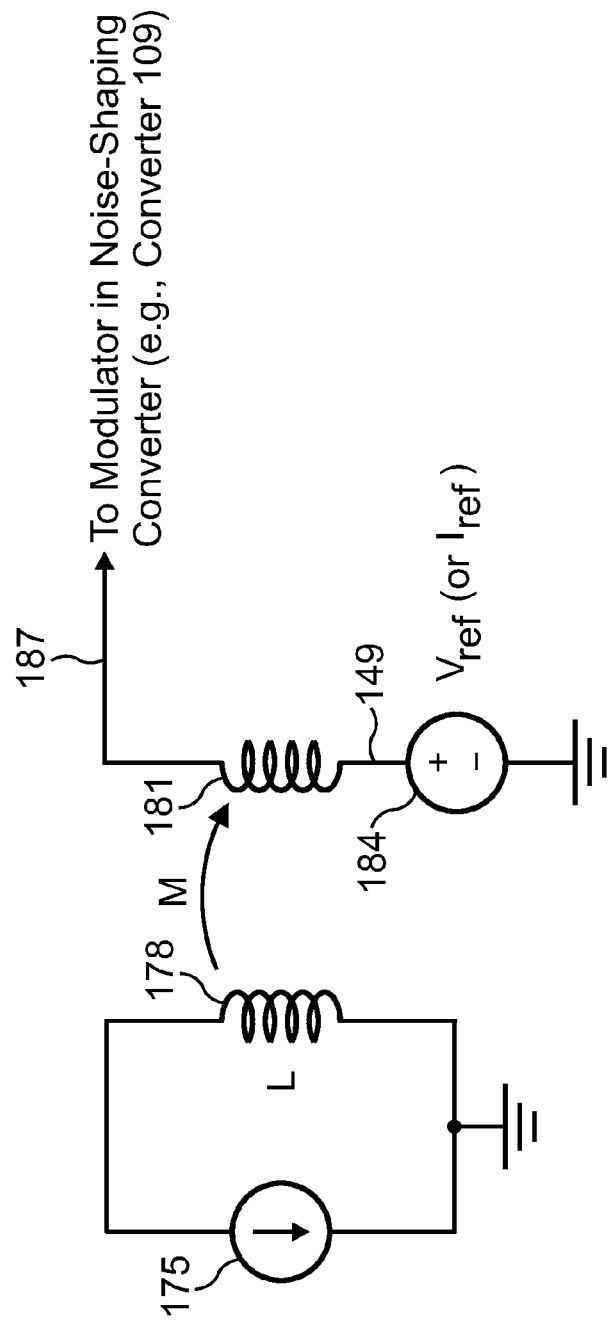
FIG. 4 shows a circuit arrangement that models one interference mechanism that result from integrating converters and RF circuitry together.

Several interference mechanisms may exist in ICs that include together the converters and the RF circuitry. FIG. 4 depicts a circuit arrangement that models one interference mechanism that result from integrating converters and RF circuitry together.

More specifically, the circuit arrangement in FIG. 4 includes a source 175. Source 175 represents the RF signal that causes interference with the noise-shaping converter integrated together with an RF apparatus. Source 175 may constitute a current signal (as FIG. 4 shows) or a voltage signal.

The circuit arrangement also includes a loop or inductor 178. Inductor 178 represents inductance in the path of the RF signal or within the circuit that operates on or generates the RF signal. The inductance may have a variety of sources, as persons of ordinary skill in the art who have the benefit of the description of the invention understand. Examples of such inductive loops constitute the inductor in an inductor-capacitor (LC) voltage-controlled oscillator (VCO), or the input bond wires of a low-noise amplifier (LNA). As another example, inductor 178 may represent parasitic inductance of coupling mechanisms, such as metal or semiconductor traces within an IC.

The circuit arrangement in FIG. 4 further includes loop or inductor 181. Inductor 181 represents parasitic inductance in the path of reference signal 149 or within the circuit that operates on or generates the that signal (e.g., reference source 184). The parasitic inductance may have a variety of sources, as persons of ordinary skill in the art who have the benefit of the description of the invention understand. For example, inductor 181 may represent parasitic inductance, such as metal or semiconductor traces within an IC.

Reference source 184 generates reference signal 149. As noted above, reference signal 149 may constitute a voltage or current signal, as desired (i.e., reference source 184 may constitute a voltage or current source, respectively). The noise-shaping converter (e.g., converter 109A) uses reference signal 149, as described above.

Inductor 178 and inductor 181 have a mutual inductance, M. Various factors, such as the relative physical proximity of circuitry integrated in an IC may give rise to mutual inductance M. Mutual inductance M causes the flow of the RF current in inductor 178 to induce an RF component in the circuit path that includes inductor 181. As a result, signal 187 (which takes into account the effect of inductor 181) no longer matches reference signal 149. Put another way, signal 187 represents a reference signal corrupted by interference from the RF signal.

One may obtain a mathematical representation for signal 187 by using the principle of superposition. More specifically, one may represent signal 187 as:

$$V'_{ref} = V_{ref} + (M/L) \cdot i_{RF},$$

where $V'_{ref}$ and $i_{RF}$ denote signal 187 and the RF current flowing through inductor 178, respectively.

An inspection of the above equation makes apparent that signal 187 includes two components. The first component represents reference signal 149 (as generated by reference source 184). The second component accounts for the interference that results from the magnetic coupling between the RF circuit and the converter circuit.

Figure 5:
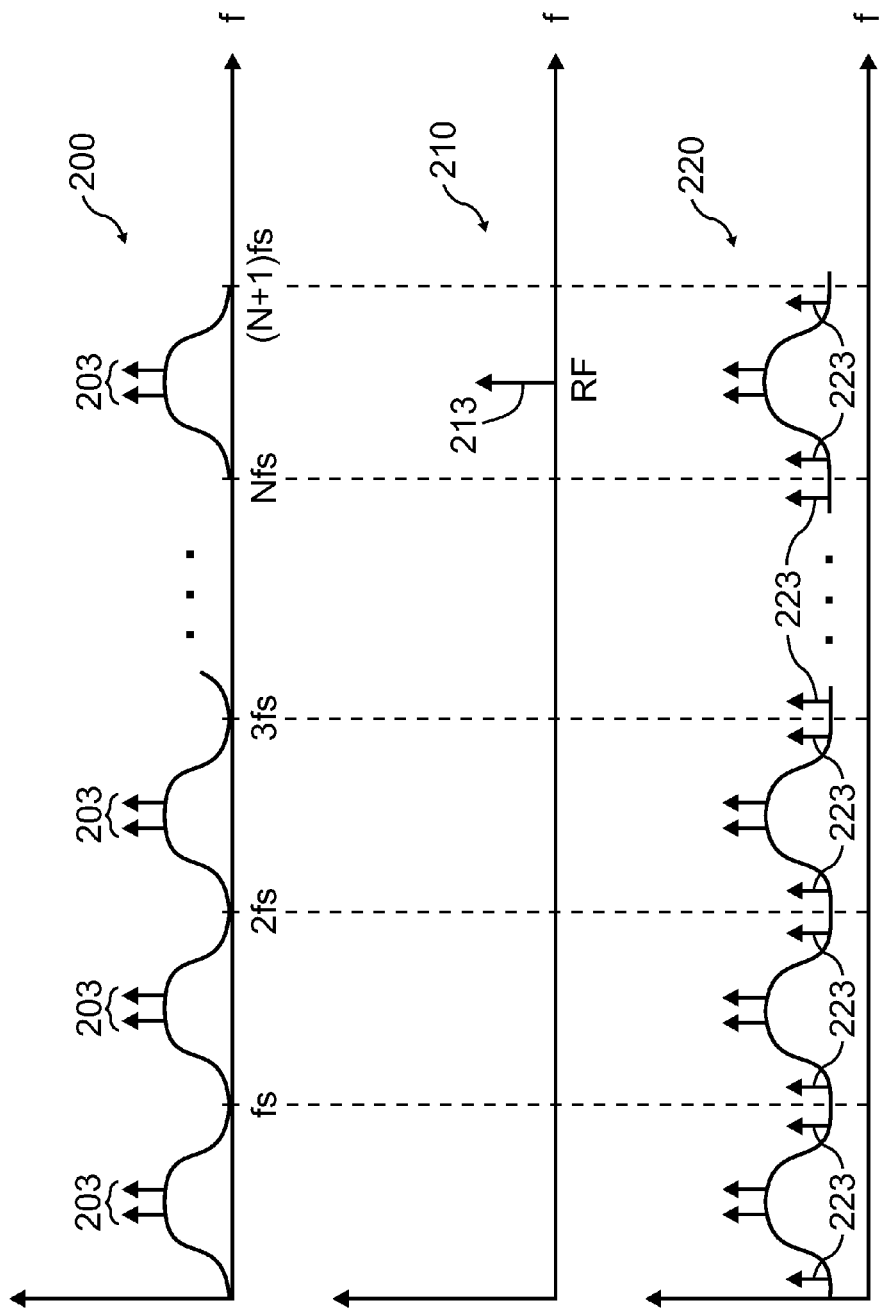
FIG. 5 illustrates waveforms associated with the down-converting of output signal of a signal converter with a coupled RF signal.
Figure 6:
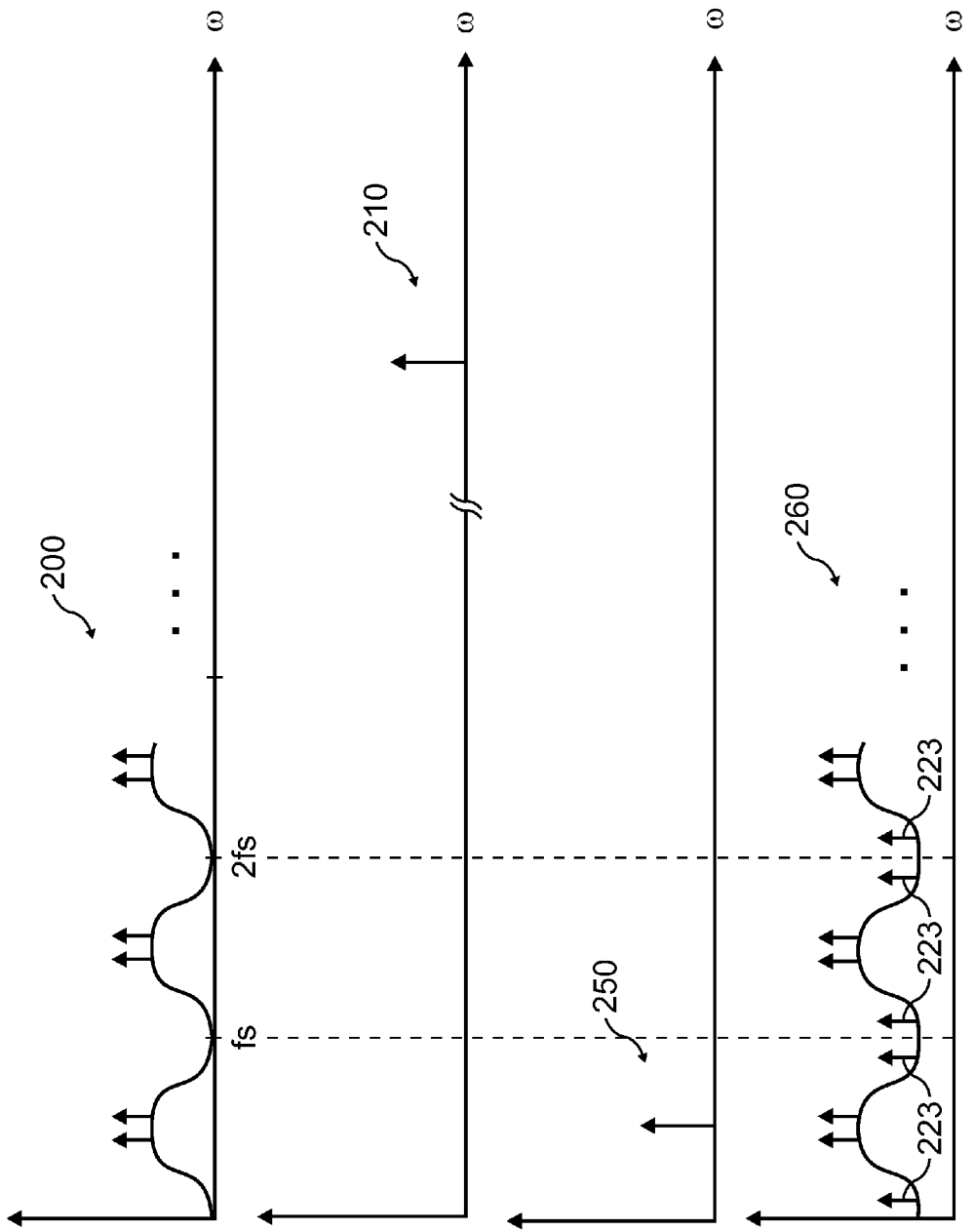
FIG. 6 depicts waveforms associated with the aliasing of an RF signal coupled to a converter circuit.

The coupling mechanism can result in degraded performance of the converter by introducing in-band spurious tones or increased in-band quantization noise. More specifically, the coupling causes two types of interference mechanism: (1) mixing or down-converting of output signal 143 of the converter with the coupled RF signal, $(M/L) \cdot i_{RF}$; and (2) aliasing of the coupled RF signal, $(M/L) \cdot i_{RF}$. FIGS. 5 and 6 illustrate the interference mechanisms, respectively.

FIG. 5 shows waveforms associated with the mixing or down-converting of output signal 143 of the signal converter with a coupled RF signal. Waveform 200 represents the spectra of uncorrupted output signal 143 of the signal converter. The discrete-time spectrum of output signal 143 repeats, with the sampling rate ($f_S$) separating the repeating spectra.

Note that the spectrum of output signal 143 includes tones 203. Tones 203 occur near odd multiples of half the sampling rate ($f_S/2$). Tones 203 represent limit cycles, as persons of ordinary skill in the art understand.

Waveform 210 depicts the coupled RF signal. Waveform 210 represents the coupled RF signal $(M/L) \cdot i_{RF}$ as tone 213. Because the spectra of output signal 143 contain relatively large frequencies (i.e., wide spectra), tone 213 falls within the range of frequencies represented in the spectra of output signal 143.

The RF signal coupled to the reference signal of converter 109A (i.e., $(M/L) \cdot i_{RF}$) modulates or mixes in modulator 150 with output signal 143. Waveform 220 represents the result of the modulation operation. Note that the modulation process causes the introduction of in-band spurious (or noise or interference) tones 223 and results in increased in-band quantization noise.

FIG. 6 illustrates waveforms associated with the aliasing of an RF signal coupled to a converter circuit. Waveform 200 represents the spectra of uncorrupted output signal 143 of the signal converter. Note that the discrete-time spectrum of output signal 143 repeats, with the sampling rate ($f_S$) separating the repeating spectra.

Similar to waveform 200 in FIG. 5, the spectrum of output signal 143 in FIG. 6 includes tones 203. Tones 203 occur near odd multiples of half the sampling rate ($f_S/2$), and represent limit cycles, as persons of ordinary skill in the art understand.

Waveform 210 depicts the coupled RF signal, $(M/L) \cdot i_{RF}$. Waveform 210 represents the coupled RF signal as tone 213. Because of sampling by a sampling or switching network within converter 109A (e.g., a switched-capacitor network), the coupled RF signal may alias to in-band tones or to a band of frequency such that it may modulate or mix with out-of-band quantization noise. Waveform 250 represents the aliased version of the coupled RF signal, for example because of sampling of the converter reference and performing the converter modulation with a switched-capacitor network.

The aliased version of RF signal coupled to the reference signal of converter 109A, as represented by waveform 250, mixes or modulates (e.g., by a return-to-zero (RTZ) switched-current or switched-resistor feedback circuit within feedback circuitry 134) with output signal 143. Waveform 260 represents the result of the sampled modulation or mixing operation. The aliasing process, the modulation or mixing process, or both, cause the introduction of in-band spurious (or noise or interference) tones 223 or result in increased in-band quantization noise.

Note that a coupled RF signal with a frequency near odd multiples of half the sampling rate ($f_S/2$) particularly contribute to the interference. The coupled RF signal, or the aliased version of it, modulates or mixes with the $f_S/2$ quantization noise or with limit cycles and produced in-band errors and interference.

Figure 7:
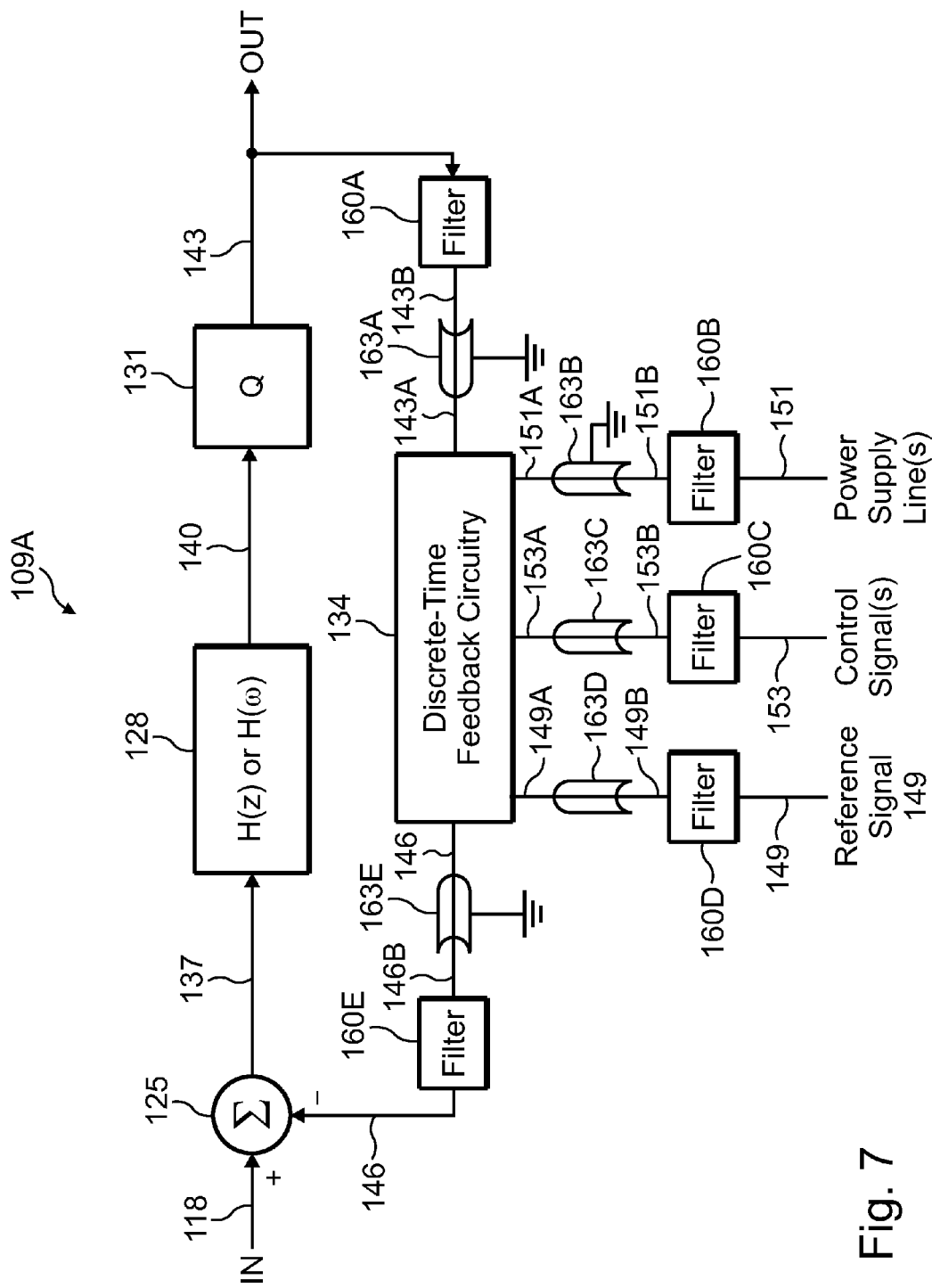
FIG. 7 shows a block diagram of a converter according to an exemplary embodiment of the invention that includes interference reduction or elimination apparatus.
Figure 8:
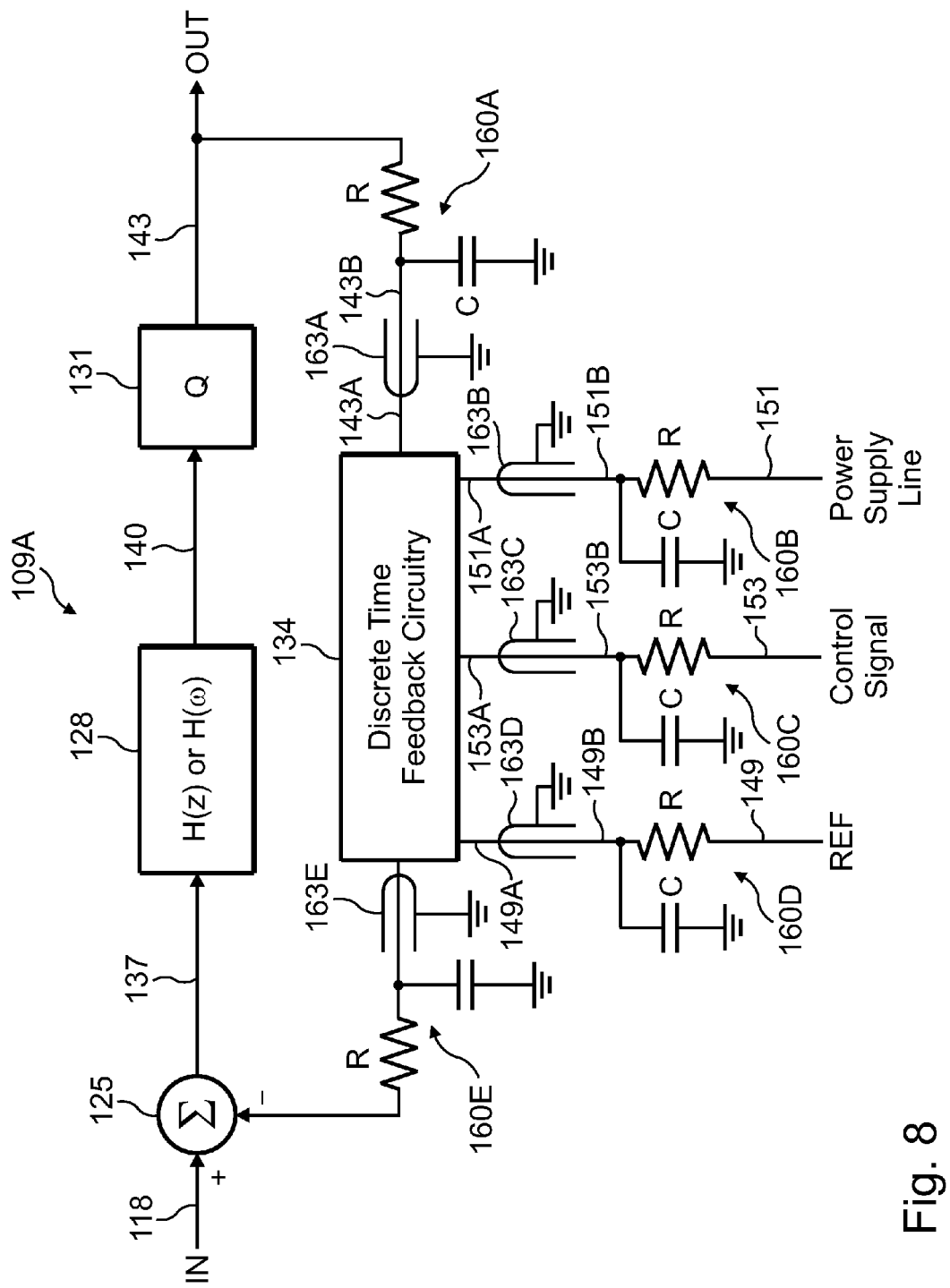
FIG. 8 illustrates a block diagram of a converter according to another exemplary embodiment of the invention that includes interference reduction or elimination apparatus.

The inventive concepts provide methods and apparatus for eliminating or reducing interference in signals converters. To do so, one may shield (including conduits) input signal(s) (including control signal(s), reference signal(s), ground line(s), and power supply line(s)), output signal(s) (including status signal(s)), or both, of the converter. Furthermore, as an alternative to shielding (including conduits), or in addition to shielding, one may filter input signal(s) (including control signal(s), reference signal(s), ground line(s), and power supply line(s)), output signal(s) (including status signal(s)), or both, of the converter. FIGS. 7 and 8 show exemplary embodiments that include interference reduction or elimination mechanisms.

FIG. 7 depicts a block diagram of a converter 109A according to an exemplary embodiment of the invention that includes interference reduction or elimination apparatus. Converter 109A includes the circuitry and blocks described above with respect to FIG. 2. In addition, FIG. 7 illustrates details of the circuitry used to reduce or mitigate interference.

Converter 109A in FIG. 7 shields and filters output signal 143 (as applied to feedback circuitry 134), reference signal 149, control signal(s) 153, and power supply line(s) 151. More specifically, filter 160A filters output signal 143, and generates filtered signal 143B. Shield (including conduits) 163A minimizes the receiving loop associated with signal 143B, and provides shielded signal 143A to feedback circuitry 134. Filter 160B filters power supply line(s) 151, and generates filtered signal 151B. Shield (including conduits) 163B provides shielding for signal 151B, and provides shielded signal 151A to feedback circuitry 134 or, generally, to any desired part of converter 109A.

Filter 160C filters control signal(s) 153, and generates filtered signal 153B. Shield (including conduits) 163C provides shielding for signal 153B, and provides shielded signal 153A to feedback circuitry 134 or, generally, to any desired part of converter 109A. Filter 160D filters reference signal 149, and generates filtered signal 149B. Shield 163D (including conduits) provides shielding for signal 149B, and provides shielded signal 149A to feedback circuitry 134 (and/or other parts of converter 109A, as desired).

Shield (including conduits) 163E minimizes the receiving loop associated with signal 146A (received from feedback circuitry 134), and provides shielded signal 146B to filter 160E. Filter 160E filters signal 146B, and generates signal 146. Filter 160E operates to reduce or eliminate interference that may otherwise couple into feedback circuitry 134 via its output. Thus, filter 160E filters any RF interference that may couple back into feedback circuitry 134 via its output.

Note that one may use a similar arrangement (a filter and/or shield) to reduce interference with respect to any signal provided to, or received from, converter 109A, as desired, and as persons of ordinary skill in the art who have the benefit of the description of the invention understand. For example, one may shield and/or filter any status signal(s) generated by feedback circuitry 134 (or any part of converter 109), as desired.

FIG. 8 shows a block diagram of a converter 109A according to another exemplary embodiment of the invention that includes interference reduction or elimination apparatus. Converter 109 in FIG. 8 is similar to converter 109A in FIG. 7. Converter 109A in FIG. 8, however, uses a particular type of filter to implement filters 160A-160E.

More specifically, filters 160A-160E in FIG. 8 constitute single-pole resistor-capacitor (RC) filters. Note, however, that the filter shown in FIG. 8 constitutes merely an example, and that one may implement filters to reduce interference in a variety of ways. The choice of filter topology and implementation depends on factors such as design and performance specifications and characteristics of a particular converter, as persons of ordinary skill in the art who have the benefit of the description of the invention understand.

At least one more coupling mechanism exists that may result in interference that degrades the performance of a signal converter or continuous-time feedback circuit or system. In general, the coupling mechanism affects any network or circuit that has sensitivity to jitter in a reference signal, such as a clock signal.

More particularly, an RF signal (e.g., from the RF apparatus in an IC that includes such a converter) may cause interference by coupling to the internal clock network of the RF apparatus, hence resulting in noisy or degraded clock signals. The clock signals typically drive various circuitry, such as the converter. A noisy, corrupted, or degraded clock signal may therefore adversely impact the operation of the converter.

Note that the interfering RF signal need not originate in the IC that includes the converter. For example, the RF signal may originate from an another circuit and couple to the IC through its bond wires.

Figure 9:
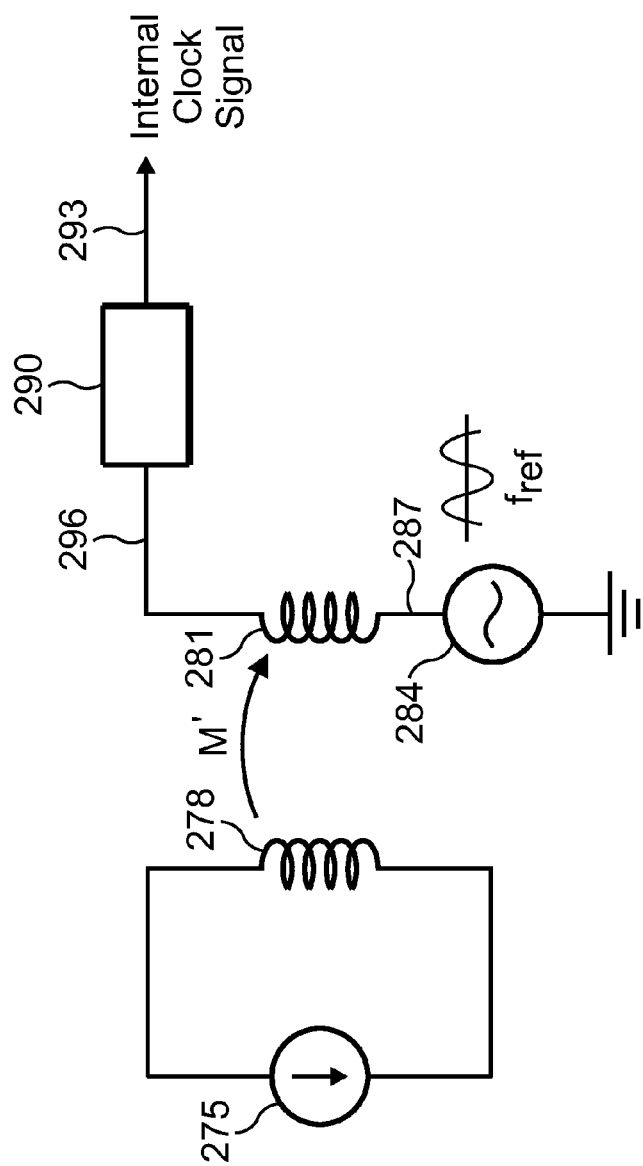
FIG. 9 depicts a circuit arrangement that models the interference mechanism that results from RF signals coupling to a reference signal source or circuit.

FIG. 9 depicts a circuit arrangement that models the interference mechanism that results from RF signals coupling to a reference signal source or circuit. The circuit arrangement in FIG. 9 includes a source 275. Source 275 represents the RF signal that causes interference with the clock network or circuitry (and, hence, with the noise-shaping converter). The RF signal may have a variety of sources, such as local oscillator (LO) circuitry. Source 275 may constitute a current signal (as FIG. 9 shows) or a voltage signal.

The circuit arrangement also includes loop or inductor 278. Inductor 278 represents inductance in the path of the RF signal or within the circuit that operates on or generates the RF signal or parasitic inductance in the IC that includes the signal converter. The inductance may have a variety of sources, as persons of ordinary skill in the art who have the benefit of the description of the invention understand. For example, inductor 278 may represent parasitic inductance, such as metal or semiconductor traces of bond wires of the IC.

The circuit arrangement in FIG. 9 further includes loop or inductor 281. Inductor 281 represents parasitic inductance in the circuit or path that includes reference source 284. The parasitic inductance may have a variety of sources, as persons of ordinary skill in the art who have the benefit of the description of the invention understand. For example, inductor 281 may represent parasitic inductance, such as metal or semiconductor traces or bond wires of the IC.

Reference source 284 generates a reference signal 287. A clock signal generator circuit 290 uses reference signal 287 to generate a clock signal 293. Clock signal generator circuit 290 may constitute a variety of circuits, as desired. The choice of clock signal generator 290 and its implementation depends on factors such as design and performance specifications and characteristics for a particular RF apparatus, as persons of ordinary skill in the art with the benefit of the description of the invention appreciate. Generally, clock signal generator 290 includes a non-linear circuit or clipping circuit. By way of illustration, clock signal generator 290 may include a limiter or an inverter, as desired.

Reference signal 287 may constitute a voltage or current signal, as desired (i.e., reference source 284 may constitute a voltage or current source, respectively). Reference signal 287 may have any desired frequency. The frequency of reference signal 287 depends on a number of factors, such as the particular protocols or standards that the RF apparatus within which reference source 284 resides meets. For example, in one embodiment, reference signal 287 may have a frequency of 13 MHz. In another illustrative embodiment, reference signal 287 may have a frequency of 26 MHz.

Inductor 278 and inductor 281 have a mutual inductance, M'. Mutual inductance M' may exist because of various causes, such as the proximity of the circuits integrated in an IC. Mutual inductance M' causes the flow of the RF current in inductor 278 to induce an RF component in the circuit path that includes inductor 281. As a result, signal 296 (which takes into account the effect of inductor 281) fails to match reference signal 287. Put another way, signal 296 represents a reference signal corrupted by interference from the RF signal.

One may obtain a mathematical representation for signal 296 by using the principle of superposition. More specifically, one may represent signal 296 as:

$$V'=V+(M'/L)\cdot i_{RF},$$

where V', V, and $i_{RF}$ denote reference signal 296, signal 287 and the RF current flowing through inductor 278, respectively.

One may determine from an inspection of the above equation that signal 296 includes two components. The first component represents reference signal 287 (as generated by reference source 284). The second component accounts for the interference that results from the magnetic coupling between the RF circuit and the circuit that includes reference source 284.

Figure 10:
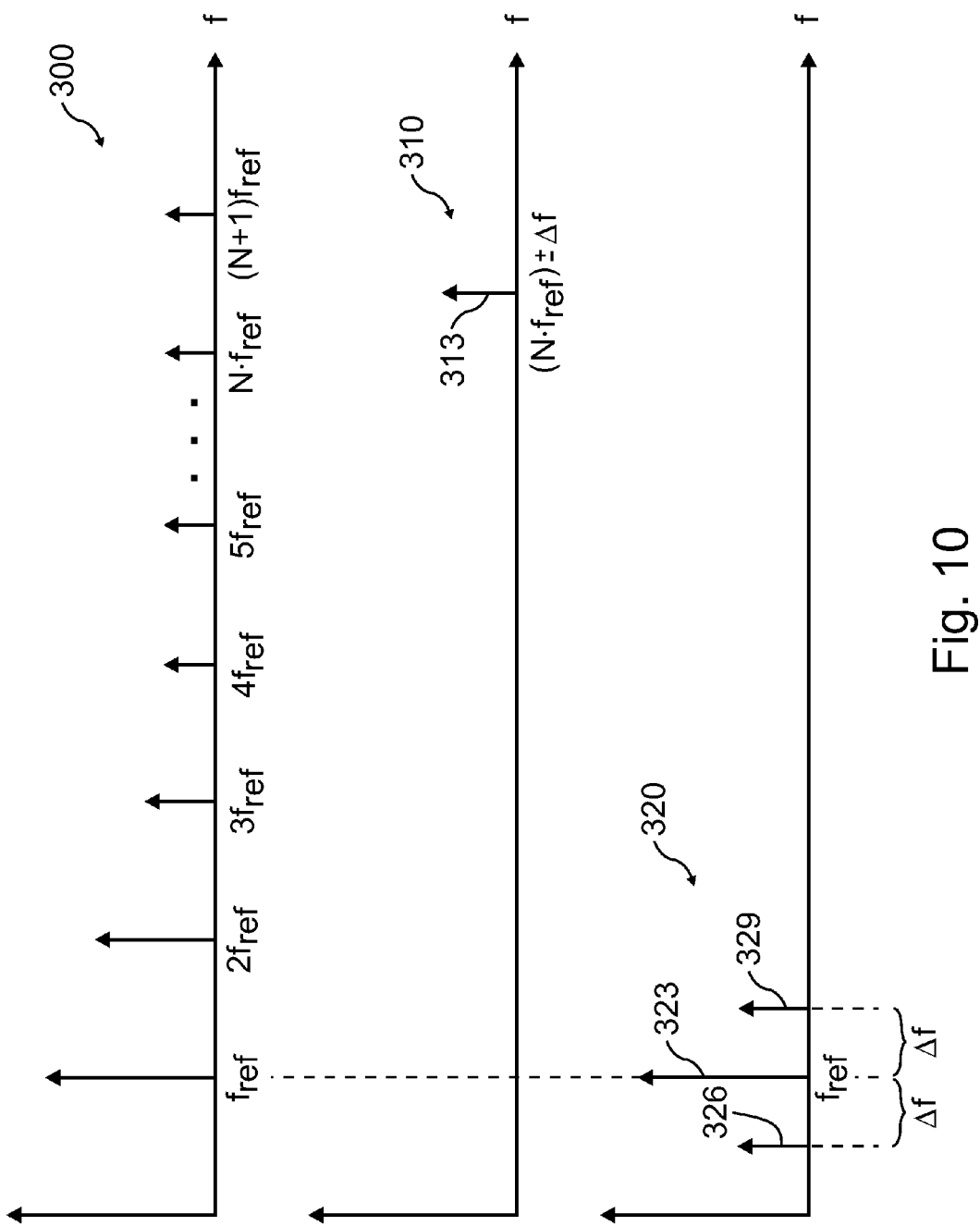
FIG. 10 shows waveforms associated with interference that results from coupling between an RF signal and a reference or clock generation circuit.

FIG. 10 shows waveforms associated with interference that results from coupling between an RF signal and a reference or clock generation circuit. Waveform 300 represents the spectra of reference signal 287. The spectra has components at $N\cdot f_{ref}$, where N and $f_{ref}$ denote an integer number and the frequency of reference signal 287, respectively. (Note that the tone at frequency $f_{ref}$ alone may cause interference.)

Waveform 310 depicts the coupled RF signal (e.g., an LO signal). Waveform 210 represents the coupled RF signal as tone 313. Tone 313 may occur at a frequency of $N\cdot f_{ref}\pm\Delta f$, where $\Delta f$ represents a frequency difference.

Clock signal generator circuit 290 limits or "squares up" the reference clock, and folds or aliases the coupled RF signal (as represented by tone 313). The folding or aliasing causes jitter in clock signal 293. Waveform 320 represents the result of the folding or aliasing operation. (Note that, for the sake of clarity of presentation, waveform 320 shows only one component of the resulting signal.)

The spectra in waveform 320 include a tone 323 at frequency $f_{ref}$ and side tone 326 and side tone 329 at frequencies $f_{ref}-\Delta f$ and $f_{ref}+\Delta f$, respectively. Side tone 326 and side tone 329 represent jitter in clock signal 293. The jitter in clock signal 293 in turn causes degradation of the performance of the converter, as persons of ordinary skill in the art who have the benefit of the description of the invention understand.

One may reduce or eliminate the interference from the coupled RF signal and the resulting clock jitter by filtering signal 296 (see FIG. 9) and/or shielding (including conduits) it. Doing so removes or tends to reduce the RF component in the signal supplied to the input of clock signal generator 290.

Figure 11:
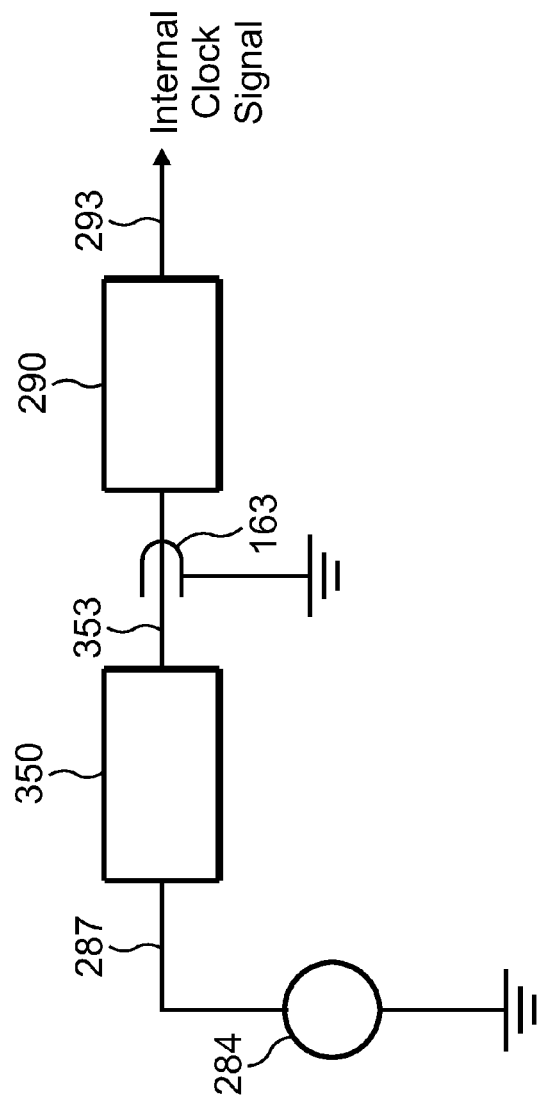
FIG. 11 illustrates a block diagram of a circuit arrangement for generating clock signals according to an exemplary embodiment of the invention.

FIG. 11 illustrates a block diagram of a circuit arrangement for generating clock signals according to an exemplary embodiment of the invention. Filter 350 filters reference signal 287 and generates filtered signal 353. One may shield (including conduits) filtered signal 353, by using shield or conduit 163, as desired. Filtered signal 353 couples to the input of clock signal generator 290. Because of the filtering operation of filter 350, clock signal 293 has no jitter or has reduced jitter.

Note that one may use a variety of circuits to implement filter 350 in order to reduce or eliminate interference. The choice of the topology and implementation of filter 350 depends on factors such as design and performance specifications and characteristics of a particular desired converter or apparatus, as persons of ordinary skill in the art who have the benefit of the description of the invention understand.

Furthermore, one may use a variety of shields (including conduits) to implement shield (including conduits) 163 in order to reduce or eliminate interference. The choice of the topology and implementation of shield 163 depends on factors such as design and performance specifications and characteristics of a particular desired converter or apparatus, as persons of ordinary skill in the art who have the benefit of the description of the invention understand.

Figure 12:
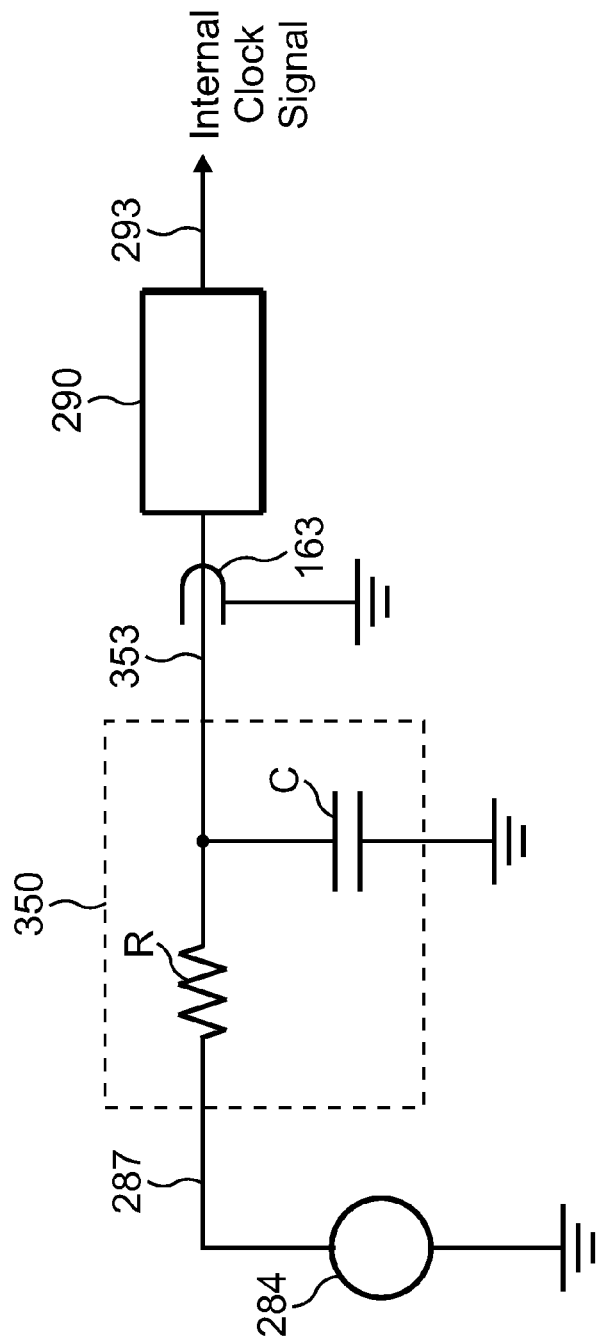
FIG. 12 depicts a block diagram of a circuit arrangement for generating clock signals according to another exemplary embodiment of the invention.

FIG. 12 depicts a block diagram of a circuit arrangement for generating clock signals according to another exemplary embodiment of the invention. The circuit arrangement in FIG. 12 is similar to the circuit arrangement in FIG. 11. The circuit arrangement in FIG. 12, however, uses a particular type of filter to implement filter 350. More specifically, filter 350 in FIG. 12 constitutes a single-pole resistor-capacitor (RC) filter.

An aspect of the invention relates to shielding (including conduits) signals to reduce interference. FIGS. 13-20 illustrate several techniques according to the invention to shield signals and circuit or IC elements by routing signal conductors or coupling mechanisms through conduits. Note that one may use the techniques to reduce loop area or contain, reduce, or eliminate currents in either transmitting or interfering circuits or in receiving circuits (circuits affected by the interference from the transmitting or interfering circuits).

Figure 13:
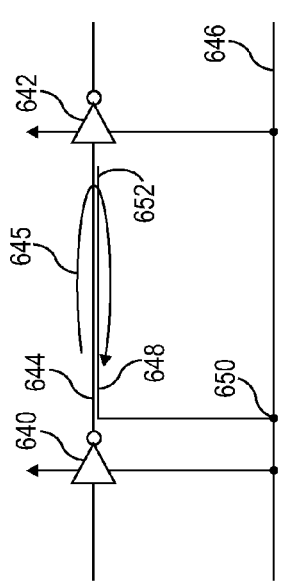
FIG. 13 shows a schematic diagram illustrating a conductive strip used to shield a signal line.

FIG. 13 is a schematic diagram of two similar circuit elements 640 and 642 connected together by a signal line 644. The technique of the present invention uses a conductive strip 648 connected at one end 650 to ground (i.e., a reference voltage). The opposite end 652 of the conductive strip 648 is not connected to ground. As a result, the conductive strip 648 acts as a shield to the signal line 644 and provides a return path for high frequency components of the current which flows along the signal line 644.

The strip 648 increases the route capacitance, but manages the return path. As a result of the strip 648, the signal line 644 is no longer capacitively coupled to the ground return 646, but is capacitively coupled to the conductive strip 648. FIG. 13 shows a current loop 645 which flows through the route capacitance formed between the signal line 644 and strip 648. In other words, the loop area of the present invention (FIG. 13) includes the area between the signal line 644 and the conductive strip 648 (rather than the area between the signal line 544 and the ground return 546 in conventional solutions).

It can be seen that the loop area is greatly reduced by the conductive strip 648. Note that the conductive strip 648 is most effective with the end 652 not connected to anything since if it were otherwise connected, some of the current could flow back through the ground return 646.

Figure 14:
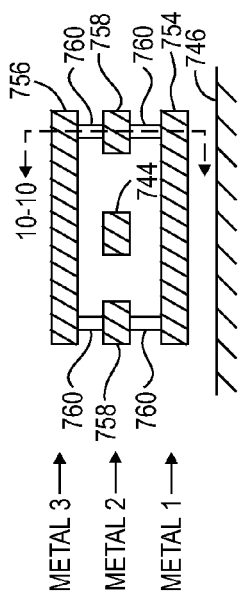
FIGS. 14-20 illustrate various embodiments of the conductive strip shown in FIG. 13.

FIGS. 14-20 illustrate many implementations of the conductive strip shown in FIG. 13 in an IC having a substrate and three metal layers. FIG. 14 is a sectional end view illustrating a silicon substrate 746 and three conductive or metal layers (METAL 1, METAL 2, METAL 3) of an IC. A signal line 744 is formed in the METAL 2 layer. A first conductive strip 754 is formed on the METAL 1 layer directly below the signal line 744.

A second conductive strip 756 is formed on the METAL 3 layer directly above the signal line 744. Finally, conductive strips 758 are formed in the METAL 2 layer on each side of the signal line 744. The conductive strips 754, 756, and 758 are connected to each other by vias 760 and are grounded at one end (like conductive strip 648 is grounded at end 650).

The opposite ends of the conductive strips 754, 756, and 758 are not connected to anything. As shown, the conductive strips 754, 756, and 758 surround the signal line 744 forming a conduit which shields the signal line 744 much like a coaxial cable is shielded. As mentioned above, the current loop area is greatly reduced by the conduit, reducing the mutual inductance of the loop to any other loop on the IC.

Figure 15:
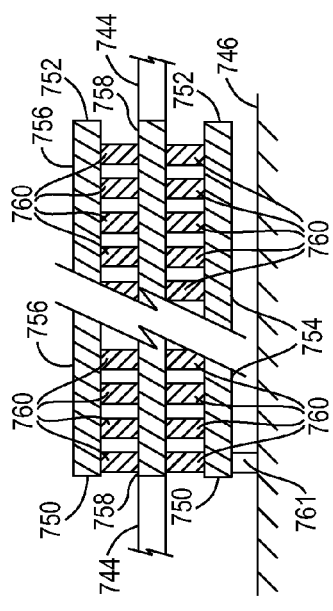

FIG. 15 is a sectional side view taken along line 10-10 of FIG. 14. FIG. 15 helps to illustrate how the conductive strips are connected or not at each end. FIG. 15 shows the conductive strips 754 and 756 connected to ground (the substrate 746) by contact 761 at one end 750. As shown, the opposite ends 752 are not connected to ground. The signal line 744 is shown extending past the ends 752 where it will be connected to a circuit component such as component 642 (FIG. 13).

Figure 16:
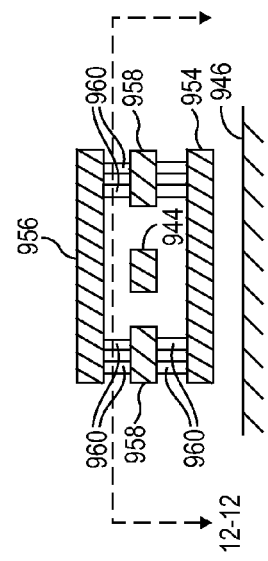

FIGS. 16-20 illustrate alternate forms of the conduits of the present invention. FIG. 16 is a sectional end view similar to the present invention. FIG. 16 is a sectional end view similar to FIG. 14. However, the conduit shown in FIG. 16 includes two rows of vias 960 connecting the conductive strips 954, 956, and 958. The embodiment shown in FIG. 16 more completely shields the signal line 944.

Figure 17:
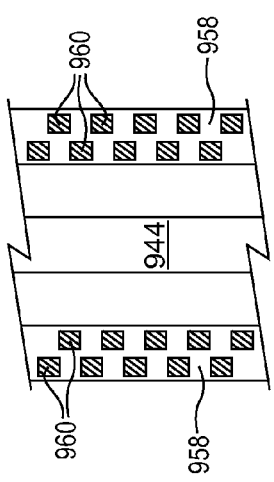

FIG. 17 is a top sectional view taken along line 12-12 in FIG. 16 showing the signal line 944 and the conductive strips 958. FIG. 17 also shows the layout of the vias 960. As shown, the vias 960 are arranged in separate staggered rows forming a "fence" or checkerboard type of pattern. This layout of vias 960 provides more shielding in the gaps between the conductive strips. Note that vias could be staggered in other ways.

Figure 18:
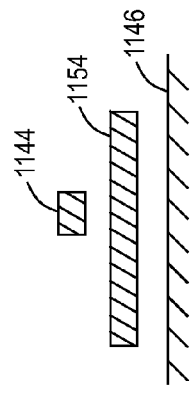
Figure 19:
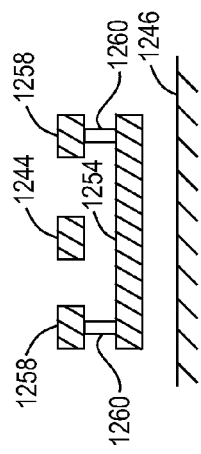

FIG. 18 shows an embodiment with only one conductive strip 1154 positioned between the signal line 1144 and the substrate 1146. The conductive strip 1154 is the same as the conductive strip 754 shown in FIG. 14, but without vias or other conductive strips. FIG. 19 shows an embodiment that provides better shielding than the embodiment shown in FIG. 18.

Figure 20:
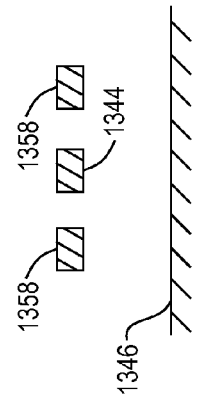

The embodiment shown in FIG. 19 allows a signal to be routed in the METAL 3 layer, while providing shielding of the signal line 1244 by the combination of conductive strips 1254, 1258, and vias 1260. FIG. 20 shows an embodiment with two conductive strips 1358 positioned on opposite sides of the signal line 1344.

The conductive strips 1358 are the same as the conductive strips 758 shown in FIG. 14, but without vias connected to other conductive strips. The embodiments shown in FIGS. 18-20 will help to shield the signal lines 1144, 1244, and 1344 but not as thoroughly as the embodiment shown in FIGS. 14-16. It can be seen that many different combinations of conductive strips and metal layers may be used to implement the conduits of the present invention.

One may apply shielding techniques, such as the techniques described above, to various parts or components (e.g., resistors, capacitors, and inductors) of the interference reduction filters, as desired. For example, consider the situation where the filter constitutes an RC filter (see, for instance, filter 350 in FIG. 12). One may shield the plate(s) of the capacitor C, as desired. In addition (or as an alternative), one may shield the implant or diffusion area (or other region, such as polysilicon) that implements or realizes the resistor R, as desired. One may apply similar techniques to inductors, as desired.

Note that one may implement shields to reduce interference according to the invention in a variety of ways (such as the techniques described above). The choice of the shielding mechanism and its implementation depends on factors such as design and performance specifications and characteristics of a particular converter, as persons of ordinary skill in the art who have the benefit of the description of the invention understand.

Persons of ordinary skill in the art who have the benefit of the description of the invention appreciate that the inventive concepts are flexible and lend themselves to a variety of implementations and design choices. For example, one may apply the inventive interference reduction or elimination techniques to some, but not necessarily all, signals or components related to a converter or non-linear block, as desired. As another example, one may switch the order or position of the filter and shield (e.g., a shield followed by a filter, rather than a filter followed by a shield), as desired.

Referring to the figures, the various blocks shown depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of the invention understand.

Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only. As persons of ordinary skill in the art with the benefit of the description of the invention understand, one may make many modifications to the circuit arrangements described here and shown in the accompanying figures, as desired, without departing from the inventive concepts.

For example, one may use fewer, more, or different signals, signal links, conductors, and the like in the interfaces, as desired. As another example, one may modify and generalize the circuitry and concepts to accommodate other sizes of the various variables, such as input sizes, output sizes, number of inputs, outputs, and signals, and the like. By modifying the circuit arrangements shown, one may use desired buses, bus interface mechanisms and circuitry, IP blocks, logic circuitry, and the like. The modifications depend on the design and performance specifications for a particular implementation and, as noted, fall within the knowledge of persons skilled in the art who have the benefit of the description of the invention.

Furthermore, persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

We claim:

1. An apparatus, comprising an integrated circuit (IC) adapted for operating on radio frequency (RF) signals, the integrated circuit (IC) comprising baseband circuitry to process an RF signal and generate an output signal; and noise-shaping converter to process the output signal, wherein an input and/or an output of the noise-shaping converter is shielded to reduce interference resulting from inductive coupling or RF signal coupling.

2. The apparatus of claim 1, wherein a reference signal input of the noise-shaping converter is shielded.

3. The apparatus of claim 1, wherein a power supply input of the noise-shaping converter is shielded.

4. The apparatus of claim 1, wherein the noise-shaping converter comprises a delta-sigma converter; a delta modulator; a single-loop converter; a multiple-loop converter; a multi-stage noise-shaping circuitry (MASH); a converter with a single-bit feedback path or circuitry; or a converter with a multi-bit feedback path or circuitry.

5. The apparatus of claim 1, wherein the noise-shaping converter operates on an in-phase signal.

6. The apparatus of claim 5, further comprising an additional noise-shaping converter, wherein the additional noise-shaping converter operates on a quadrature signal.

7. The apparatus of claim 1, wherein the interference results from inductive coupling between a first inductor and a second inductor.

8. The apparatus of claim 7, wherein the first inductor comprises inductance used in a voltage-controlled oscillator (VCO).

9. The apparatus of claim 7, wherein the first inductor comprises inductance from a bond wire of the integrated circuit (IC).

10. The apparatus of claim 7, wherein the first inductor comprises parasitic inductance.

11. The apparatus of claim 7, wherein the second inductor comprises parasitic inductance in a path of a reference signal coupled to the noise-shaping converter.

12. The apparatus of claim 1, wherein the interference results from RF signal coupling to an internal clock circuit of the integrated circuit (IC).

13. The apparatus of claim 12, wherein an internal clock signal of the integrated circuit (IC) is filtered to generate a filtered clock signal.

14. The apparatus of claim 13, wherein the filtered clock signal is shielded.

15. An apparatus, comprising an integrated circuit (IC) adapted for operating on radio frequency (RF) signals, the integrated circuit (IC) comprising an amplifier coupled to provide an amplified signal, and a noise-shaping converter adapted to process a signal derived from the amplified signal, wherein an input and/or an output of the noise-shaping converter is shielded to reduce interference in the integrated circuit (IC).

16. The apparatus according to claim 15, wherein the noise-shaping converter comprises a subtracter, a signal-processing circuit, a quantizer, and a modulator.

17. The apparatus according to claim 15, wherein the noise-shaping converter comprises a subtracter, a signal-processing circuit, a quantizer, and a feedback circuit.

18. An apparatus, comprising an integrated circuit (IC) adapted for operating on radio frequency (RF) signals, the integrated circuit (IC) comprising intermediate frequency (IF) circuitry to process an RF signal and generate an output signal; and noise-shaping converter to process the output signal, wherein an input and/or an output of the noise-shaping converter is filtered to reduce interference resulting from inductive coupling or RF signal coupling.

19. The apparatus according to claim 18, wherein an input and/or an output of the noise-shaping converter is shielded to reduce interference.

20. The apparatus according to claim 18, wherein the noise-shaping converter comprises feedback circuitry coupled to the output of the noise-shaping converter.

* * * * *